United States Patent
Bender et al.

(10) Patent No.: US 11,150,056 B2
(45) Date of Patent: *Oct. 19, 2021

(54) SYSTEM AND METHOD FOR DYNAMIC CAMOUFLAGING

(71) Applicant: INTERNATIONAL BUSINESS MACHINES CORPORATION, Armonk, NY (US)

(72) Inventors: Michael Bender, Rye Brook, NY (US); Rhonda L. Childress, Austin, TX (US); Timothy J. Forshee-Lee, Greensboro, NC (US); Mary E. Rudden, Denver, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/585,577

(22) Filed: Sep. 27, 2019

(65) Prior Publication Data

US 2020/0025524 A1    Jan. 23, 2020

Related U.S. Application Data

(63) Continuation of application No. 15/175,565, filed on Jun. 7, 2016, now Pat. No. 10,502,532.

(51) Int. Cl.
*G06K 9/00* (2006.01)
*G06K 9/20* (2006.01)
(Continued)

(52) U.S. Cl.
CPC .......... *F41H 3/00* (2013.01); *G06K 9/00664* (2013.01); *G09G 5/37* (2013.01)

(58) Field of Classification Search
CPC .. G06K 9/00; G06K 9/209; B32B 3/10; F41H 3/00; Y10T 428/24802; G06T 3/60
See application file for complete search history.

(56) References Cited

U.S. PATENT DOCUMENTS 9,175,930 B1   11/2015   Pezeshkian et al.
9,818,214 B2   11/2017   Cincotti et al.
(Continued)

FOREIGN PATENT DOCUMENTS

JP    2005127651    5/2005

OTHER PUBLICATIONS

Display system—JP2005127651A—Google Patents_2005 (Year: 2005).*

(Continued)

*Primary Examiner* — Shahid K Khan
*Assistant Examiner* — Ahamed I Nazar
(74) *Attorney, Agent, or Firm* — Brian Restauro; Andrew D. Wright; Roberts Calderon Safran & Cole, P.C.

(57) ABSTRACT

Systems and methods for dynamic camouflaging are disclosed. A computer-implemented method can be used with the system including determining, by a computing device, if current environment image data is available for a location of one or more users, and instructing, by the computing device, at least one image-enabled clothing system of the one or more users to display a camouflage image based on the determining. The camouflage image is based on the current environment image data when the current environment image data is available, and the camouflage image is based on historic image data associated with the location of the one or more users when the current environment image data is not available.

20 Claims, 4 Drawing Sheets

(51) Int. Cl.
*F41H 3/00* (2006.01)
*G06T 3/60* (2006.01)
*G09G 5/37* (2006.01)

(56) References Cited

U.S. PATENT DOCUMENTS

| | | | |
|---|---|---|---|
| 2002/0090131 A1* | 7/2002 | Alden | G02B 26/06 |
| | | | 382/154 |
| 2004/0036006 A1 | 2/2004 | Dowling | |
| 2007/0034774 A1 | 2/2007 | Blake | |
| 2009/0154777 A1 | 6/2009 | Cincotti et al. | |
| 2010/0234106 A1* | 9/2010 | Kojima | A63F 13/52 |
| | | | 463/31 |
| 2012/0091111 A1 | 4/2012 | Schwarz | |
| 2012/0154196 A1 | 6/2012 | Cincotti et al. | |
| 2012/0182276 A1 | 7/2012 | Kee | |
| 2012/0318129 A1* | 12/2012 | Jackson | F41H 3/00 |
| | | | 89/36.02 |
| 2013/0083999 A1 | 4/2013 | Bhardwaj et al. | |
| 2013/0163867 A1 | 6/2013 | Cincotti et al. | |
| 2014/0010449 A1 | 1/2014 | Haaramo et al. | |
| 2014/0125506 A1 | 5/2014 | Sjölund | |
| 2015/0143601 A1 | 5/2015 | Longinotti-Buitoni et al. | |
| 2015/0178988 A1 | 6/2015 | Montserrat Mora et al. | |
| 2015/0241176 A1 | 8/2015 | Schwarz | |
| 2015/0320588 A1 | 11/2015 | Connor et al. | |
| 2015/0358557 A1 | 12/2015 | Terre et al. | |
| 2016/0066716 A1 | 3/2016 | Rao | |
| 2016/0354232 A1 | 12/2016 | Rozental | |
| 2017/0076476 A1 | 3/2017 | Nakajo et al. | |
| 2017/0140574 A1 | 5/2017 | Sugita et al. | |
| 2017/0350676 A1 | 12/2017 | Bender et al. | |

OTHER PUBLICATIONS

Camouflage with photographic image tile array_GB2455119A—Google Patents_2009 (Year: 2009).*

Anonymous, "SmartCamo Color Changing Camouflage Materials presented by Hyperstealth CEO at Brussels International Camouflage Symposium", http://hyperstealth.com/Brussels/index.html, 2010, 5 pages.

IBM Academy of Technology Channel, "Security and Internet of Things: A World of Possibilities (Full Version dated Nov. 2015)", https://www.youtube.com/watch?v=AzS4v8xQUQI, YouTube.com, Nov. 17, 2015, 3 pages.

Anonymous,"LIBER8 Technology", http://www.liber8tech.com, Accessed Feb. 25, 2016, 1 page.

Anonymous, "i luminate", http://iluminate.com, Accessed Feb. 25, 2016, 5 pages.

List of IBM Patents or Patent Applications Treated as Related, Sep. 26, 2019, 1 page.

* cited by examiner

SYSTEM AND METHOD FOR DYNAMIC CAMOUFLAGING

STATEMENT REGARDING PRIOR DISCLOSURES BY THE INVENTOR OR A JOINT INVENTOR

The following grace period disclosure by the inventor is submitted under 35 U.S.C. § 102(b)(1)(A): YouTube Video, "Security and Internet of Things: A World of Possibilities (FULL VERSION dated November 2015)", https://www.youtube.com/watch?v=AzS4v8xQUQI, IBM Academy of Technology Channel, Published on Nov. 17, 2015, 3 pages.

BACKGROUND

The present invention relates generally to displaying images on image-enabled clothing and, more particularly, to methods and systems for dynamic camouflaging using image-enabled clothing.

Historically, the camouflaging of objects for hunting or military objectives has been limited to designing generic camouflage patterns to match broad categories of environments. For example, a camouflage pattern may be generically patterned to camouflage objects in a desert environment or a forested environment, but not both. Thus, if a user moves between environments, different camouflage clothing or other concealing devices need to be employed. Providing specific camouflage clothing or other concealing devices for each environment traversed by a user can be costly and burdensome. Further, camouflage patterns designed generically for a category of environment (e.g., desert or forest), may not provide the level of concealment desired by a user.

SUMMARY

In an aspect of the invention, a computer-implemented method includes: determining, by a computing device, if current environment image data is available for a location of one or more users; and instructing, by the computing device, at least one image-enabled clothing system of the one or more users to display a camouflage image based on the determining. The camouflage image is based on the current environment image data when the current environment image data is available, and the camouflage image is based on historic image data associated with the location of the one or more users when the current environment image data is not available.

In another aspect of the invention, there is a computer program product for dynamically camouflaging objects, the computer program product comprising a computer readable storage medium having program instructions embodied therewith. The program instructions are executable by a computing device to cause the computing device to: receive current environment image data from a first image capture device having a first perspective; receive current environment image data from a second image capture device having a second perspective; display a first camouflage image generated from the current environment image data of the first image capture device on a first portion of at least one image-enabled clothing system; and display a second camouflage image generated from the current environment image data of the second image capture device on a second portion of the at least one image-enabled clothing system.

In another aspect of the invention, there is a system for dynamically camouflaging a user. The system includes a CPU, a computer readable memory and a computer readable storage medium associated with a computing device; program instructions to determine if current environment image data is available for a location of one or more remote users; program instructions to generate at least one camouflage pattern based on the determination, wherein the at least one camouflage pattern is based on the current environment image data when available, and the camouflage pattern is based on historic image data associated with the location of the one or more users when the current environment image data is not available; and program instructions to send the at least one camouflage pattern to the one or more remote users.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
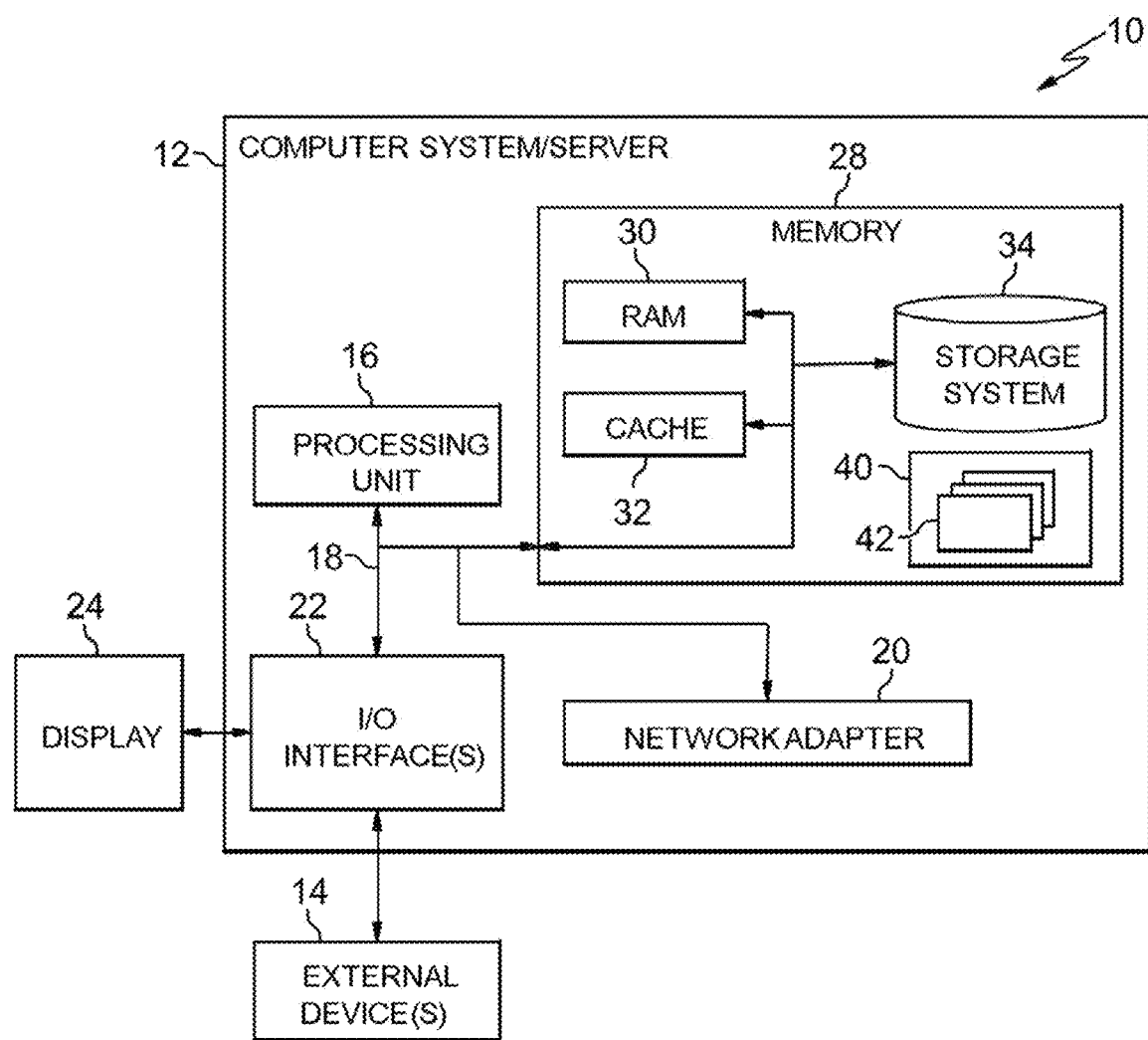
FIG. 1 depicts a computing infrastructure according to an embodiment of the present invention.

The present invention relates generally to computer-based systems and methods for dynamically camouflaging objects. In implementations of the present invention, one or more image capture devices or cameras are used to capture local scenery at an area of interest, and the image data is utilized to produce a camouflage image on an article of image-enabled clothing. The one or more image capture devices may be located on a body of a user, on a peer, or may be associated with a satellite or unmanned aerial vehicle (UAV). In embodiments, if local cameras are not available, recent satellite pictures from the area of interest may be offered as an alternative, based on global positioning system (GPS) location data of a user. In aspects, a picture of the user is used as an input to account for personal body differences (e.g., hair color, skin tones, etc.). Modification to a camouflage pattern may be tailored to provide a warning to others where only partial camouflage is preferred for the human eye but still hidden from non-human observers. For example, an orange vest pattern may be displayed on a hunter's image-enabled clothing article, which is not visible to a deer but which is easily seen by the human eye. In embodiments, the one or more image capture devices feed a software program in the cloud to create a pixel pattern (camouflage) that would optimize the ability of a user to hide in a particular location. In aspects, as a user moves, the software program sends new patterns to account for new local conditions. For example, the patterns can change to optimize the ability of a user to hide in beach conditions, forest conditions (including thin or dense forests), green grass, snow, or other conditions. In aspects, an injury of a user based on local Internet of Thing (IoT) sensors allow for the system to alert others of a problem.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
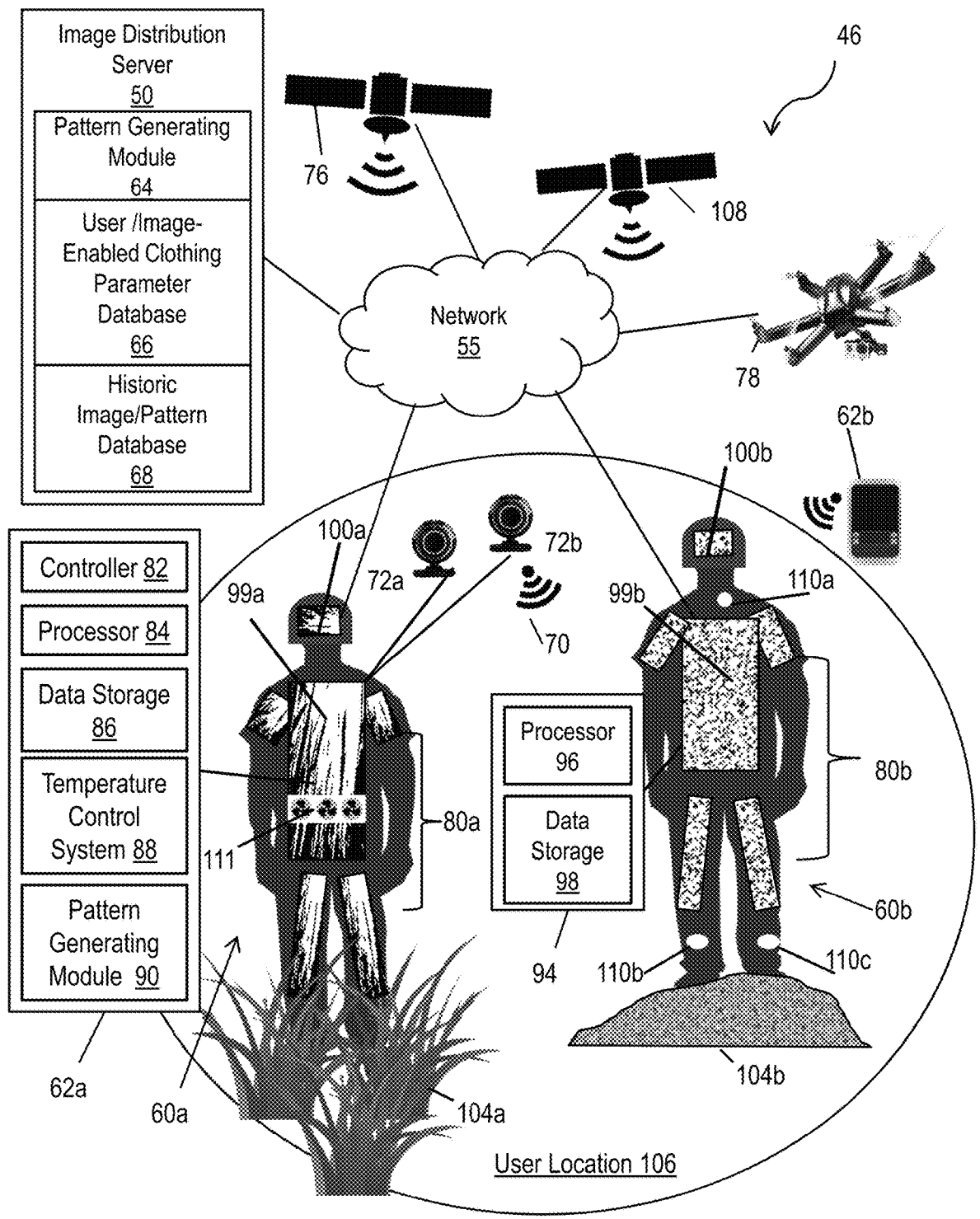
FIG. 2 shows an exemplary environment in accordance with aspects of the invention.

FIG. 2 shows an exemplary environment in accordance with aspects of the invention. In embodiments, the environment constitutes a system 46 for dynamically camouflaging users, including an image distribution server 50 (e.g., a web server) connected to a network 55. The network 55 may be any suitable communication network or combination of networks, such as a local area network (LAN), a general wide area network (WAN), and/or a public network (e.g., the Internet).

The image distribution server 50 may comprise a computer system 12 of FIG. 1, and may be connected to the network 55 via the network adapter 20 of FIG. 1. The image distribution server 50 may be configured as a special purpose computing device that is controlled by a third party image distributor, or may be a special purpose computing device that is controlled by a participant (e.g., government agency) of system 46. In embodiments, the image distribution server 50 is configured to communicate with one or more users 60a, 60b through respective participant computing devices 62a, 62b. Still referring to FIG. 2, the image distribution server 50 includes a pattern generating module 64, a user/image-enabled clothing parameter database 66, and a historic image/pattern database 68. In embodiments, user and image-enabled clothing parameters may be communicated wirelessly by the participant computing devices (e.g., 62a, 62b) to the image distribution server 50 to be stored in the database 66. User and image-enabled clothing parameters may be communicated as part of a registration process, such as through a registration website. Image data gathered by the image distribution server 50 is stored in the database 68, as is camouflage pattern data generated by the pattern generating module 64.

In aspects of the invention, image data (indicated at 70 in FIG. 2) can be gathered by the system 46 using a number of different methods and different image gathering devices.

Image gathering devices that may be utilized with the present invention include first and second body cameras 72a and 72b, a camera (not shown) on participant computing device 62b, an image gathering satellite 76, and an unmanned aerial vehicle (UAV) camera 78. In aspects, one or more cameras are rotatably attached to a user. It should be understood that other types of image gathering devices could also be utilized, such as video cameras, etc.

In embodiments, camouflage pattern data generated by the pattern generating module 64 is transmitted to the participants 60a, 60b via the network 55. For example, camouflage pattern data may be transmitted to a special purpose participant computing device 62a, which is part of an image-enabled clothing system 80a. Image-enabled clothing system comprises one or more image-enabled wearable devices. In embodiments, the participant computing device 62a includes a controller 82, a processor 84, a data storage 86, a temperature control system 88 and a pattern generating module 90. In aspects of the invention, the participant computing device 62a may include one or more components of computer 12, wherein the processing unit 16 constitutes the special purpose processor 84, the storage system 34 constitutes the data storage 86, and the program modules 42 include the pattern generating module 90. In embodiments, camouflage pattern data may be generated by the pattern generated module 90 in the participant computing device 62a. In embodiments, the participant computing device 62a is configured to utilize camouflage pattern data generated by the image distribution server 50.

In embodiments, camouflage pattern data generated by the pattern generating module 64 or the pattern generating module 90 is transmitted to a mobile participant computing device 62b, which may be in the form of a mobile phone, a personal computer, a tablet, or the like. Camouflage pattern data received by the participant computing device 62b may then be transmitted to a controller 94 of an image-enabled clothing system 80b, either wirelessly or through a hardware connection (not shown). In aspects of the invention, the controller 94 includes a processor 96 and data storage 98. Camouflage pattern data received by the participants 60a and 60b may then be converted into a camouflage image(s) (e.g., 99a, 99b) and displayed on display areas (e.g., 100a, 100b) of respective image-enabled clothing systems 80a, 80b. It should be understood that image-enabled clothing systems 80a, 80b discussed herein may include display areas placed over some or all of the arms, legs, torso, feet, head or other part(s) of participants 60a and 60b.

In accordance with the present invention, the manufacture of image-enabled clothing as used in image-enabled clothing systems 80a, 80b, may be accomplished by attaching a panel of light emitting diode (LED) lights with microprocessors in a linear grid pattern, and wiring the lines together to be controlled by a single processor such as a tweensy, which can in turn communicate with a controller (e.g., 82, 94) to control the pixel display through low energy Bluetooth. The panel may then be attached to an under layer of material, which has an overlay of several layers of opaque fabric to hide the LEDs and create image display areas (e.g., 100a, 100b). The opaque fabric preferably has enough density to hide the lights but still allow the LEDs to be seen when illuminated. The LEDs may be mounted individually or on a strip. In the "lighted" mode, patterns can be created depending on the density of the LEDs, both horizontally and vertically. The present invention is not intended to be limited to a particular image-enabled clothing article or design. Instead, the present invention is intended for use with any wearable article having an image display area (e.g., 100a, 100b).

In aspects of the invention, camouflage pattern data generated from different area backgrounds or environment backgrounds (represented by 104a, 104b in FIG. 2) is utilized to display different camouflage patterns on one or more display areas (e.g., 100a, 100b) of the image-enabled clothing systems 80a, 80b, depending on a user location 106. User location 106 may comprise a specific location (e.g., geographic coordinates), a predetermined area (e.g., 100 feet from a set of geographic coordinates), or a general location or environment background (e.g., desert, forest, etc.). In aspects of the invention, a global positioning system (GPS) satellite 108 may be utilized to determine the user location 106.

In aspects of the invention, the system 46 can be utilized in emergency or extraction situations to highlight, rather than camouflage, the participant 60a, 60b. By way of example, the image-enabled clothing systems 80a, 80b can be configured to display bright, colorful and/or flashing images to attract attention to the position of a participant 60a, 60b. In embodiments, one or more sensors indicated at 110a-110c can be incorporated, or used in conjunction with, the image-enabled clothing systems 80a, 80b and can be configured to send sensor data to one or more of the image distribution server 50, the controller 94, the participant computing device 62b and the participant computing device 62a. Sensors 110a-110c may include biosensors, such as heart rate sensors and body temperature sensors. Sensors 110a-110c may also include light sensors, one or more gyroscopes, or other environmental sensors. Sensor data can be processed by one or more of the image distribution server 50, the controller 94, the participant computing device 62b and the participant computing device 62a. Temperature sensor data may be utilized by temperature control system 88 of the participant computing device 62a to maintain desired temperature conditions for an image-enabled clothing system 80a. Biosensor data may be utilized by the system 46 to determine if a participant is experience a health risk or physical trauma, for example. If it is determined that sensor data received from the biosensors 110a-110c indicates an emergency situation (e.g., participant 60b is experiencing significant physical stress), then instructions can be sent to the image-enabled clothing system (80a, 80b) of the participant to display an emergency image, as will be discussed in more detail below.

It should be understood that the system 46 of the present invention can have some or all of the components shown in FIG. 2. The manner in which various components are utilized with respect to one another can vary, depending on the desired use of system 46. For example, image distribution server 50 may be utilized to gather data from one or more participants 60a, 60b, generate camouflage patterns, and distribute the camouflage patterns to the one or more participants 60a, 60b. In another example, the participant computing device 62a may gather data from one or more participants 60a, 60b, generate camouflage patterns and distribute the camouflage patterns to the one or more participants 60a, 60b. The system 46 can be utilized in conjunction with a single participant, or may be utilized in conjunction with a group of participants. Additional details regarding possible uses of system 46 will be discussed in more detail below with respect to FIGS. 3 and 4.

Figure 3:
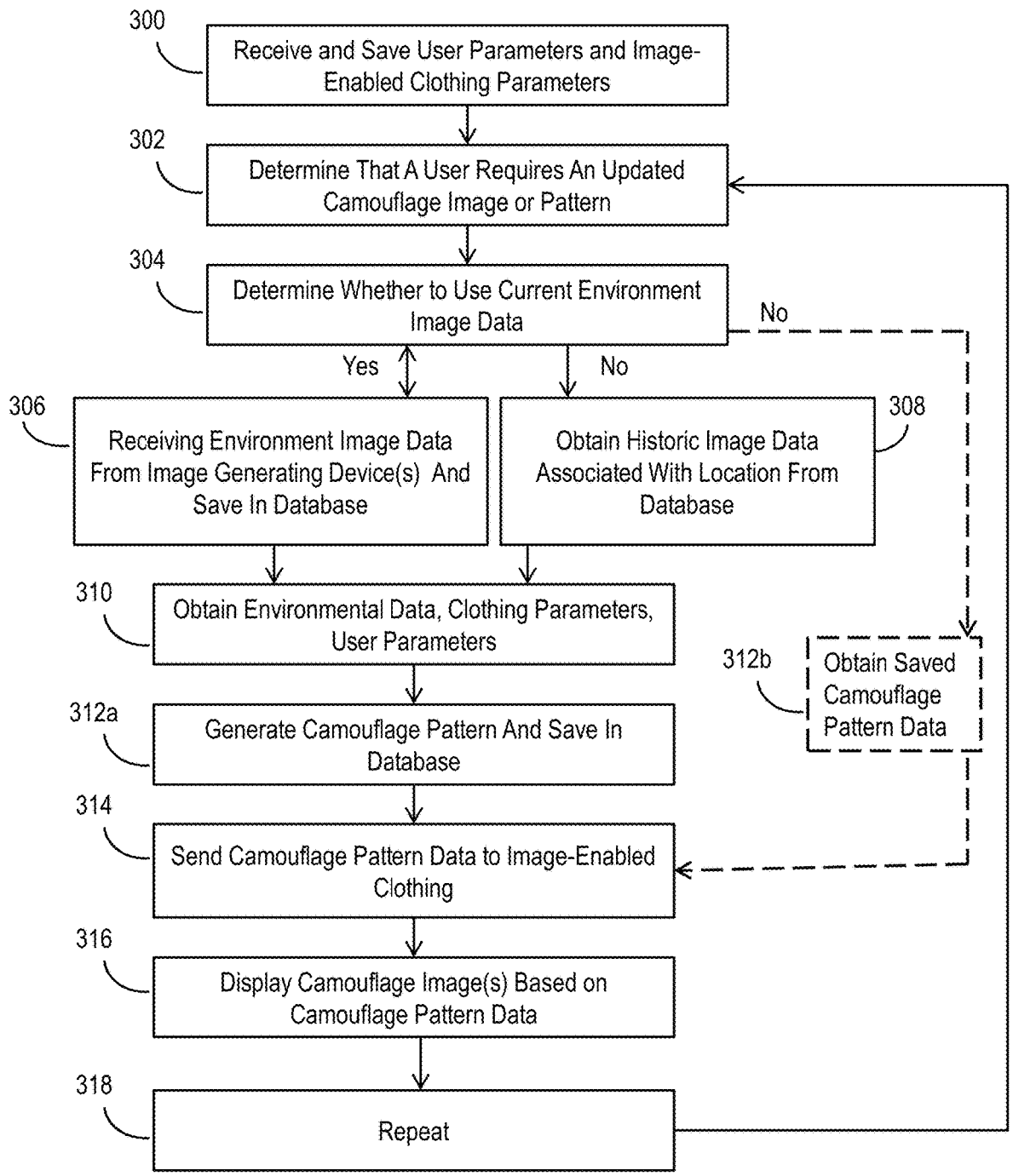
FIG. 3 shows a flowchart of steps of a method in accordance with aspects of the invention.

FIG. 3 shows a flowchart of a method in accordance with camouflage aspects of the invention. Steps of the method of FIG. 3 may be performed in the environment illustrated in FIG. 2, and are described with reference to elements shown in FIG. 2.

At step 300 user parameters and image-enabled clothing system parameters are received and saved in a database. User parameters may include physical characteristics of a user, such as skin tone, height and build, or any other information which may be relevant to developing customized camouflage images for a user. Image-enabled clothing parameters may include image display capabilities (e.g., size of image display areas, number of image display areas, configuration of image display areas, pixels, colors available for display, etc.), data storage capabilities (e.g., data storage size), or other information regarding image-enabled clothing systems 80a, 80b pertinent to the display of camouflage images. Step 300 may be performed as part of a registrations process. Step 300 may be performed by image distribution server 50 or by a participant computing device 62a, 62b. For example, a participant 60b may register with a third party provider through a website, and the data communicated during registration may be stored in user/image-enabled clothing parameter database 66 of image distribution server 50. In another example, user parameters and image-enabled clothing parameters may be received by a participant computing device 62a, and the parameters saved locally in data storage 86.

At step 302, a determination is made whether a participant 60a, 60b requires an updated camouflage image or camouflage pattern. This determination can be conducted utilizing a plurality of different methods, examples of which will be discussed in more detail below.

At step 304, a determination is made whether to use current environment image data. The term current environment image data as used herein is intended to mean image data captured recently in time, and within an acceptable distance from a user location 106, such that the image data captured accurately reflects the current surroundings or environment background of a user. Step 304 may be performed by image distribution server 50 or by a participant computing device 62a, 62b. In embodiments, the determination of step 304 is made based on whether current environment image data is available for a user location 106. For example, if an image satellite 76 is being utilized to gather current environment image data for a user location 106, the image distribution server 50 may determine at step 304 that there is an interruption in the transmission of image data from the image satellite 76 to the image distribution server 50. Thus, no current environment image data would be available to the image distribution server 50, and the image distribution server 50 would determine not to use current environment image data. By way of another example, if image data from a UAV camera 78 is being sent to a participant computing device 62b for use in generating camouflage patterns, but the UAV camera 78 is determined to be out of service by the participant computing device 62b, then participant computing device 62b would determine that no current environment image data will be used at step 304. In another example, it may be determined that current environment image data for a user location 106 is available to a participant computing device 62a via body cameras 72a, 72b, and the participant computing device 62a will determine that current environment image data will be used at step 304.

At step 306 environment image data is received from an available image gathering device (e.g., 72a, 72b, 76, 78, 62b) and saved in a database (e.g., 68, 86, 98). In embodiments, images of a participant's surrounding area backgrounds can be captured by multiple cameras (e.g., 72a, 72b). For example, a background to the north of a user can be different from the background to the south of a user, and multiple cameras (e.g., 72a, 72b) can be used to capture images to the north (e.g., first image) and south (e.g., second image) of the user. In this way, system 46 can generate camouflage images for display on multiple displays of an image-enabled clothing system 80a, 80b, which are more effective in camouflaging a whole person. In aspects, remote input from other participants (e.g., peers) in the area can be used to generate different perspective images to be displayed on separate display areas of one or more participants. In embodiments, sensors 110-110c may include a gyroscope to collect orientation data for an image-enabled clothing system (80a, 80b). Orientation data can be utilized by system 46 to determine if a participant (e.g., 60a, 60b) has rotated or changed orientation, and may alter the display of images accordingly. For example, images may rotate across displays of an image-enabled clothing system (80a, 80b) by a controller (82, 94) as the participant/wearer rotates, such that the rotating display would prevent an observer from readily recognizing the movement of the participant (e.g., images from the north would continue to be viewed by an observer as the participant rotates). This embodiment may be particularly useful when images from different camera perspectives (e.g., 72a, 72b) result in the generation of significantly distinct camouflage patterns.

In aspects of the invention, the current environment image data saved at step 306 is associated with location data identifying the location associated with the environment image data. For example, current environment image data 70 taken at a desert location 104b may be saved with location data indicating that the environment image data was taken at the desert location 104b. In another example, current environment image data received by image distribution server 50 from image gathering satellite(s) 76 is saved with geographic coordinates associated with the current environment image data.

Step 306 can be performed before, after, or in conjunction with step 304. For example, if current environment image data 70 is received by a participant computing device 62a from body cameras 72b, and stored in data storage 86 at step 306, then at step 304, participant computing device 62a may determine that current environment image data is available and will be utilized.

At step 308, historic image data associated with a participant's current location 106 may be obtained if it is determined that current environment image data will not be used at step 304. Step 308 may be performed by image distribution server 50 or by a participant computing device 62a, 62b. By way of example, the participant computing device 62b may include GPS technology enabling the participant computing device 62b to determine the location of the participant 60b. Location data of the participant 60b can be matched with location data associated with historic image data (stored in data storage 98 or data storage of the participant computing device 62b) in order to determine which historic image data to utilize for the participants current location 106. It should be understood that the term "historic image data" is intended to mean any stored image data that is not current environment image data. For example, historic image data may be only minutes old, but the use of current environment image data that more accurately reflects the current surroundings or environment background of the user may still be desired. In embodiments, seasonal and weather data may be associated with the saved historic image data, and the seasonal and weather data may be accounted for when choosing historic image data. For example, the participant computing device 62*b* may determine that the device 62*b* is currently located in a desert location 104*b* in winter, and will then retrieve historic image data from data storage 98 associated with the desert location 104*b* in winter. In embodiments, historic image data without associated seasonal and weather data for a particular location may be altered by a processor of the present invention to adjust for seasonal and weather differences. For example, a processor may generate a camouflage pattern from historic image data for a particular location and, upon receiving instructions from a participant, may replace colored portions of the pattern with white portions to more accurately simulate a snowy environment. Seasonal and weather adjustment may be enabled through participant computing device (e.g., 62*a*, 62*b*), or through a controller (e.g., 94) of an image-enabled clothing system (e.g., 80*b*).

At step 310, the environment image data from steps 306 or 308 (i.e., current environment image data or historic image data), as well image-enabled clothing system parameters, are obtained. Optionally, user parameters may also be obtained at step 310. It should be understood that step 310 can be implemented by image distribution server 50 or by a participant computing device 62*a*, 62*b*.

At step 312*a*, the environment image data and image-enabled clothing system parameters obtained at step 310 are utilized to generate a camouflage pattern appropriate for the user location 106 and the particular image-enabled clothing system 80*a*, 80*b* utilized. It should be understood that step 312*a* can be implemented by the pattern generating module 64 of image distribution sever 50, or by a pattern generating module (e.g., 90) of a participant computing device 62*a*, 62*b*. In embodiments, a pattern generating module (e.g., 64, 90) uses display characteristics of an image-enabled clothing system (e.g., 80*a*, 80*b*) to determine an optimal camouflage pattern based on color and shape information from the environment image data. Optionally, user parameters can also be utilized at step 312*a* in the generation of a camouflage pattern. By way of example, a participant's skin tone, height and other physical characteristics may be utilized by the pattern generating module (e.g., 64, 90) to generate camouflage patterns customized for the participant. In embodiments, the current environment image data is image data from a plurality of cameras, and a plurality of camouflage patterns are generated to reflect differences in the current environment image data captured by respective ones of the plurality of cameras. For example, a first camouflage pattern can be generated based on image data from a front body camera 75*a* for display on a back side of an image-enabled clothing system 80*a*, while a second camouflage pattern can be generated based on image data from a back body camera 75*b* for display on a front side of the image-enabled clothing system 80*a*. In embodiments, remote input (image data) from other participants in the vicinity can be utilized to generate different camouflage images for different viewing perspectives. For example, image data from a body camera 72*a* and image data from a camera in participant computer device 62*b* can be utilized to generate camouflage patterns at step 312*a*.

The camouflage pattern (camouflage pattern data) generated at step 312*a* is then saved in one or more databases of the present invention (e.g., 68, 86, 98). In aspects of the invention, generated camouflage patterns are saved with associated location information in a local database (e.g., data storage 86 of participant computing device 62*a*) and on a remote database (e.g., historic image/pattern database 68 of image distribution server 50). The saved camouflage patterns may also be saved with other identifying information, such as the season (e.g., winter, spring, summer) or other environmental conditions (e.g., snowy, rainy, etc.).

At step 314, camouflage pattern data generated at step 312*a* is sent to one or more image-enabled clothing systems 80*a*, 80*b*. It should be understood that step 314 can be performed by image distribution server 50 or by a participant computing device 62*a*, 62*b*. For example, image distribution server 50 may transmit data over the network 55 to a controller 82, 94 of one or more image-enabled clothing systems 80*a*, 80*b*, wherein the data defines the camouflage pattern data generated at step 312*a*. In another example, a participant computing device 62*a*, 62*b* can transmit data over a local connection (e.g., local wireless or hardware connection) to one or more image-enabled clothing systems 80*a*, 80*b*, wherein the data defines the camouflage pattern data generated at step 312*a*.

Optionally, if it is undesirable or impossible to obtain a newly generated camouflage pattern at step 312*a*, saved or historic camouflage pattern data may be obtained at step 312*b* from a system database (e.g., 68, 86, 98) for use at step 314. Step 312*b* can be performed by image distribution server 50 or by a participant computing device 62*a*, 62*b*. In embodiments, the image distribution server 50 compares user location data to saved location information associated with saved historic camouflage patterns to determine if a historic camouflage pattern is available for the user location 106. In embodiments, a participant computing device 62*a*, 62*b* may determine if a historic camouflage pattern of the user location 106 is available from a local database (e.g., 86, 98) at step 312*b*. By way of example, participant computing device 62*b* may determine that a user is at a specific location using GPS technology, and determine that a historic camouflage pattern stored in data storage 98 was generated based on image data taken at a location within 1 mile of the specific location. In aspects of the invention, a participant computer device 62*a*, 62*b* is configured to enable participants to manually select a saved camouflage pattern at step 312*b*. In embodiments, a participant computing device 62*a*, 62*b*, or image distribution server 50 may be configured to alter the historic camouflage pattern selected at step 308 to account for environmental changes, such as seasonal changes or precipitation.

At step 316, one or more camouflage patterns received at step 314 is displayed in one or more display areas (e.g., 100*a*, 100*b*) of one or more image-enabled clothing systems (e.g., 80*a*, 80*b*) as camouflage images (e.g., 99*a*, 99*b*). Camouflage images may constitute the camouflage patterns, or may be images based on the camouflage patterns (e.g., camouflage image is based on camouflage patterns but is formatted to fit display area of an image-enabled clothing system). In embodiments, image-enabled clothing systems 80*a*, 80*b* are configured to process the camouflage pattern data received, and generate camouflage images based on appropriate display formatting requirements or other parameters. In embodiments, the camouflage image may include a safety pattern, such as a virtual orange hunting vest, which will be visible to human observers but will be invisible to deer.

At step 318, the method repeats by starting over at step 302 (determine that a user requires an update camouflage pattern). The manner in which system 46 determines that one or more users require an updated camouflage pattern may vary, and may be performed manually or with a computational device of system 46. In a first example, the image distribution server 50 or the participant computing device 62*a* compares historic environment image data (which was utilizing in the generation of a first camouflage image 99a) stored in an associated database (e.g., 68, 86) with new environment image data captured for a particular user location 106 at step 306. If the comparison results in a difference between the new environment image data and the historic environment image data that meets a predetermined threshold value (e.g., color comparison shows 20% difference in color), then the image distribution server 50 or participant computing device 62a will determine that the first camouflage image 99a being displayed on the image-enabled clothing system (e.g., 80a) needs updating. In embodiments, the new environment image data will then be utilized at steps 310 and 312a. Optionally, participants may determine that a user requires an updated camouflage pattern based on their observations.

Figure 4:
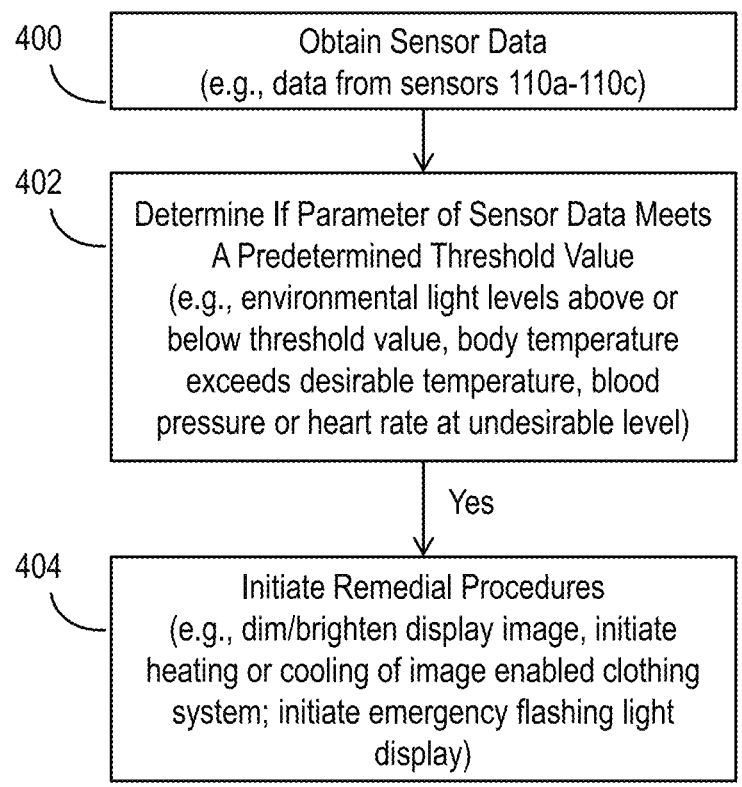
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIG. 2.

In embodiments, the system 46 can respond to different sensed conditions based on data from one or more sensors (e.g., 110a-110c), as is illustrated in FIG. 4. At step 400 sensor data is obtained from system sensors (e.g., 110a-110c) by a controller or processor of the system 46. It should be understood that any processor or controller of system 46 may be utilized in implementing the methods of FIG. 4. By way of example, sensor data may be obtained from one or more sensors 110a-110c by the controller 94 of the image-enabled clothing system 80b, or may be wirelessly transmitted by sensors 110a-110c to a participant computing device 62a, 62b or image distribution sever 50.

At step 402, the system 46 determines if a parameter of the sensor data meets a predetermined threshold value. Step 402 can be accomplished through the processing of sensor data by any processor or controller of system 46. By way of example, sensor data may be processed by the processor 96 of the image-enabled clothing system 80b, by processors of participant computing devices 62a, 62b, or by a processor of image distribution server 50, to determine if sensor data meets a predetermined threshold value. In embodiments, the predetermined threshold value is an environmental light level or a biological parameter, such as body temperature, blood pressures, or heart rate.

At step 404, if sensor data meets a predetermined threshold value, then remedial procedures are initiated by the system 46 to effect a change in an associated image-enabled clothing system 80a, 80b or camouflage image displayed thereon. In aspects of the invention, the change effected by the remedial procedure includes altering the display of camouflage images by an image-enabled clothing system (e.g., 80a, 80b) based on environmental lighting conditions. By way of example, image-enabled clothing systems (e.g., 80a, 80b) can be configured to dim the brightness of camouflage images (e.g., 99a, 99b) when data from system sensors (e.g., 110a-110c) indicates that environmental light levels have fallen below a predetermined threshold value. Likewise, image-enabled clothing systems (e.g., 80a, 80b) can be configured to brighten the display of camouflage images (e.g., 99a, 99b) when data from system sensors (e.g., 110a-110c) indicates that environmental light levels have risen above a predetermined threshold value. In embodiments, brightness levels and other display parameters may be manually adjusted through a participant computing device 62a, 62b, or directly through an image-enabled clothing system controller 94. In embodiments, image-enabled clothing systems (e.g., 80a, 80b) can be configure to brighten and dim one or more displays (e.g., 100a, 100b) in real time based on light sensors (e.g., 110a-110c) sensing a change in environment lighting conditions, such as when the sensors detect light from a spot light or flash light.

In aspects of the invention, the change effected by the remedial procedure includes altering the display of images by an image-enabled clothing system (e.g., 80, 80b) based on biosensor data from system sensors (e.g., 110a-110c). By way of example, image-enabled clothing systems (e.g., 80a, 80b) can be configured to display an alert pattern (e.g., bright flashing lights) when heart rate data indicates that a participant is in physical distress (e.g., heart rate has fallen below a predetermined threshold value), and an alert mode has been enabled. By way of another example, the camouflage image(s) may be removed from display on an image-enabled clothing system when an alert mode is enabled. In this way, a participant in distress can be more easily seen by a rescue crew, or the like. An alert mode may be enabled manually through a participant's image-enabled clothing system (e.g., 80a, 80b), by receiving instructions from another party to enable the alert mode (e.g., image distribution server 50 or another participant 60a), or both. In embodiments, when an alert mode is disabled, no alert pattern or camouflage image removal can be implemented by system 46. It should be understood that various safety procedures could be implemented to prevent an alert mode from being accidently enabled at an undesirable time and/or location.

In aspects of the invention, the change effected by the remedial procedures includes activating one or more cooling or heating devices within an image-enabled clothing system (e.g., 80, 80b) using temperature control system 88. For example, temperature control system 88 may be configured to actuate one or more fans 111 to cool the wearer of image-enabled clothing system 80a when sensor data determines that the temperature of the wearer has exceeded a predetermined threshold value. It should be understood that any wearable heating or cooling system could be utilized in accordance with the present invention.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, hunters or military organizations. In return, the service provider can receive payment from the customer(s) under a subscription and/or fee agreement and/or the service provider can receive payment from the sale of advertising content to one or more third parties.

In still another embodiment, the invention provides a computer-implemented method for dynamic camouflaging using image-enabled clothing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:
   determine if current real-world environment image data is available for a physical location of one or more users; and
   instruct at least one wearable image-enabled clothing system of the one or more users to display a camouflage image based on the determining;
   wherein the camouflage image is based on the current real-world environment image data when the current real-world environment image data is available, and wherein the camouflage image is based on historic image data associated with the physical location of the one or more users when the current real-world environment image data is not available.

2. The computer program product of claim 1, wherein the program instructions further cause the computing device to:
   determine that the one or more users require an updated camouflage image; and
   repeat the determining if the current real-world environment image data is available and the instructing, based on the determining that the one or more users requires an updated camouflage image.

3. The computer program product of claim 1, wherein the determining includes determining that the current real-world environment image data is available, and the program instructions further cause the computing device to:
   receive the current real-world environment image data from one or more image capture devices; and
   generate a camouflage pattern based on the current real-world environment image data, wherein the camouflage image is based on the camouflage pattern.

4. The computer program product of claim 3, wherein the current real-world environment image data is image data from a plurality of cameras, and wherein the generating the camouflage pattern includes generating a plurality of camouflage patterns, such that the plurality of camouflage patterns reflect differences in current real-world environment image data captured by respective ones of the plurality of cameras.

5. The computer program product of claim 4, wherein the program instructions further cause the computing device to:
   obtain orientation data for the at least one wearable image-enabled clothing system from at least one sensor;
   display the plurality of camouflage patterns on the at least one wearable image-enabled clothing system; and
   rotate a position of each of the plurality of camouflage patterns on the at least one wearable image-enabled clothing system based on the orientation data.

6. The computer program product of claim 1, wherein the camouflage image is based on the historic image data, and the program instructions further cause the computing device to:
   retrieve the historic image data based on the physical location of the one or more users; and
   generate a camouflage pattern based on the historic image data, wherein the camouflage image is based on the camouflage pattern.

7. The computer program product of claim 1, wherein the program instructions further cause the computing device to:
   obtain sensor data from one or more sensors;
   determine that a parameter of the sensor data meets a predetermine threshold value; and
   initiate a remedial procedure to effect a change in the at least one wearable image-enabled clothing system or the camouflage image based on the determining that the parameter of the sensor data meets the predetermined threshold value.

8. The computer program product of claim 7, wherein:
   the sensor data is light level data; and
   the initiating a remedial procedure comprises adjusting a brightness level of the camouflage image based on the light level data.

9. The computer program product of claim 7, wherein:
   the sensor data is biosensor data indicating a state of the one or more users; and
   the initiating the remedial procedure comprises instructing the at least one wearable image-enabled clothing system of the one or more users to display an alert pattern.

10. The computer program product of claim 7, wherein:
    the sensor data is temperature data indicating a temperature of the one or more users; and
    the initiating the remedial procedure comprises instructing a temperature control system of the at least one wearable image-enabled clothing system to initiate a cooling device to cool the at least one wearable image-enabled clothing system.

11. A computer-implemented method comprising:
    receiving, by a computing device, current environment image data from a first image capture device having a first perspective;
    receiving, by the computing device, current environment image data from a second image capture device having a second perspective;
    displaying, by the computing device, a first camouflage image generated from the current environment image data of the first image capture device on a first portion of at least one wearable image-enabled clothing system;
    displaying, by the computing device, a second camouflage image generated from the current environment image data of the second image capture device on a second portion of the at least one wearable image-enabled clothing system;
    obtaining, by the computing device, orientation data for the at least one wearable image-enabled clothing system from at least one sensor;
    and
    rotating, by the computing device, a position of the displayed first camouflage image and a position of the displayed second camouflage image based on the orientation data.

12. The computer-implemented method of claim 11, further comprising:
    determining, by the computing device, that the at least one wearable image-enabled clothing system requires an updated camouflage image; and
    determining, by the computing device, that the current environment image data from the first image capture device and the current environmental image data from the second image capture device are available.

13. The computer-implemented method of claim 11, wherein the first camouflage image and the second camouflage image are generated based on user parameters of a person utilizing the at least one wearable image-enabled clothing system, such that the first camouflage image and the second camouflage image are customized for the person.

14. The computer-implemented method of claim 11, further comprising:
obtaining, by the computing device, sensor data; and
initiating, by the computing device, a remedial procedure to effect a change in the at least one wearable image-enabled clothing system based on the sensor data.

15. The computer-implemented method of claim 14, wherein:
the sensor data is light level data; and
the remedial procedure comprises adjusting, by the computing device, a brightness level of the first camouflage image and the second camouflage image based on the light level data.

16. The computer-implemented method of claim 14, wherein:
the sensor data is biosensor data indicating a state of the one or more users of the at least one image-enabled clothing system; and
the remedial procedure comprises instructing, by the computing device, the at least one wearable image-enabled clothing system to display an alert pattern if an alert mode of the at least one wearable image-enabled clothing system is enabled.

17. A system comprising:
a CPU, a computer readable memory and a computer readable storage medium associated with a computing device;
program instructions to determine if current real-world environment image data is available for a physical location of one or more users; and
program instructions to instruct at least one wearable image-enabled clothing system of the one or more users to display a camouflage image based on the determining;
wherein the camouflage image is based on the current real-world environment image data when the current real-world environment image data is available, and wherein the camouflage image is based on historic image data associated with the physical location of the one or more users when the current real-world environment image data is not available, and
wherein the program instructions are stored on the computer readable storage medium for execution by the processor via the computer readable memory.

18. The system of claim 17, further comprising:
program instructions to determine that the one or more users require an updated camouflage image; and
program instructions to repeat the determining if the current real-world environment image data is available and the instructing, based on the determining that the one or more users requires an updated camouflage image.

19. The system of claim 17, wherein the determining includes determining that the current real-world environment image data is available, and wherein the system further comprises:
program instructions to receive the current real-world environment image data from one or more image capture devices; and
program instructions to generate a camouflage pattern based on the current real-world environment image data, wherein the camouflage image is based on the camouflage pattern.

20. The system of claim 19, wherein the current real-world environment image data is image data from a plurality of cameras, and wherein the generating the camouflage pattern includes generating a plurality of camouflage patterns, such that the plurality of camouflage patterns reflect differences in current real-world environment image data captured by respective ones of the plurality of cameras.

* * * * *